US011655780B1

(12) United States Patent
 Cavallini

(10) Patent No.: US 11,655,780 B1
(45) Date of Patent: May 23, 2023

(54) METHODS AND DEVICES FOR REDUCING NOX EMISSIONS PRODUCED BY DIESEL ENGINES

(71) Applicant: Keith E. Cavallini, West Bloomfield, MI (US)

(72) Inventor: Keith E. Cavallini, West Bloomfield, MI (US)

( * ) Notice: Subject to any disclaimer, the term of this patent is extended or adjusted under 35 U.S.C. 154(b) by 0 days.

(21) Appl. No.: 17/520,660

(22) Filed: Nov. 6, 2021

Related U.S. Application Data

(63) Continuation of application No. 16/254,285, filed on Jan. 22, 2019, now Pat. No. 11,193,454.

(60) Provisional application No. 62/620,569, filed on Jan. 23, 2018.

(51) Int. Cl.
  *F02M 25/03* (2006.01)
  *F02M 25/022* (2006.01)

(52) U.S. Cl.
  CPC ........ *F02M 25/03* (2013.01); *F02M 25/0227* (2013.01)

(58) Field of Classification Search
  CPC .......................... F02M 25/03; F02M 25/0227
  See application file for complete search history.

(56) References Cited

U.S. PATENT DOCUMENTS

| | | | |
|---|---|---|---|
| 4,502,420 A | | 3/1985 | Mezger |
| 4,558,665 A | | 12/1985 | Sandberg et al. |
| 5,148,776 A | | 9/1992 | Connor |
| 5,427,067 A | | 6/1995 | Horiuchi |
| 5,522,349 A | * | 6/1996 | Yoshihara .............. F02M 25/03 |
| | | | 123/25 Q |
| 6,418,724 B1 | * | 7/2002 | Cheng .................... F23D 14/68 |
| | | | 60/776 |
| 7,216,607 B2 | | 5/2007 | Mezheritsky et al. |
| 8,459,575 B2 | | 6/2013 | Ricco et al. |
| 8,733,326 B2 | | 5/2014 | Kim et al. |

OTHER PUBLICATIONS

Koji Takasaki, et al., Improvement of Diesel Combustion with Stratified Fuel/Water Injection Systems, Kyushu Univ., 6-10-1, Hakozaki, Higashi Ku, Fukuaoka-City, Fukuoka, 812-81, included herewith.
Rutland, F. Bedford, et al., Effects of Direct Water Injection on DI Diesel Engine Combustion, 2000-01-2938, Society of Automotive Engineers, Inc., included herewith.

\* cited by examiner

*Primary Examiner* — Jacob M Amick
*Assistant Examiner* — Charles J Brauch
(74) *Attorney, Agent, or Firm* — Buss & Benefield, PLLC; Michael A. Benefield; Brian Buss

(57) ABSTRACT

The invention includes methods and devices for preventing excessive NOx formation during the combustion event of a compression-ignition engine with any combustible fuel (diesel, Jet-A, JP8, bio fuel, etc).

11 Claims, 3 Drawing Sheets

METHODS AND DEVICES FOR REDUCING NOX EMISSIONS PRODUCED BY DIESEL ENGINES

CROSS-REFERENCE TO RELATED APPLICATIONS

This application is a continuation of U.S. patent application Ser. No. 16/254,285, filed Jan. 22, 2019, now U.S. Pat. No. 11,193,454, which claims the benefit of U.S. Provisional Patent Application Ser. No. 62/620,569, filed Jan. 23, 2018, each of which is hereby incorporated by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

The inventor has not made any prior public disclosure of the inventions disclosed herein.

BACKGROUND OF THE INVENTION

1. Field of the Invention

The inventions described herein generally relate to methods and devices for reducing NOx emissions produced by diesel engines.

2. Description of Related Art

Current market technology for reducing NOx emissions in diesel engines focuses on ways to reduce NOx in the tailpipe of the engine's exhaust gas system. The use of this technology is causing sub-standard durability and lifetime issues with the engine and exhaust gas systems. Exhaust gas recirculation (EGR), for example, is a common method of NOx abatement, but the use of EGR increases CO2, HC, and CO emissions in the engine exhaust. EGR also reduces engine life due to the engine's re-ingestion of exhaust gas, which is full of soot, as soot is abrasive and leads to internal engine wear of rockers arms, bearings, etc. Additionally, EGR only reduces NOx about 50%, which is not enough to meet emission regulation requirements. As such, after-treatment in the exhaust system is also required to further reduce the NOx emissions.

Illustrative such after-treatment techniques include selective catalytic reduction (SCR), which injects urea, which is also known as diesel exhaust fluid (DEF) into the exhaust gas. The urea or DEF reacts with the NOx in the exhaust to break it down chemically into harmless gases, in order to meet EPA requirements.

The devices described above have many field issues/malfunctions leading to high warranty costs. At the manufacturing level, for example, the hardware to implement the above-discussed systems can add $2000 to the vehicle cost when built.

Rather than addressing NOx in the exhaust gas, NOx can instead be addressed during the combustion event, so as to alleviate the need for complex exhaust systems and allow for a much cleaner burning engine.

For example, some have studied the injection of water into the air intake ports of diesel engines during the combustion cycle, while others have studied the intermittent injection of fuel and water through the same injector during the combustion cycle. These approaches, and others, are more thoroughly discussed in the following references, each of which is incorporated herein by reference in its entirety: U.S. Pat. No. 4,502,420 to Mezger, U.S. Pat. No. 4,558,665 to Sandberg et al., U.S. Pat. No. 5,148,776 to Connor, U.S. Pat. No. 5,522,349 to Yoshihara et al., and U.S. Pat. No. 7,216,607 to Mezheritsky et al. Although some these techniques have served to reduce the presence of NOx in the exhaust gas, none of them have served to reduce NOx to a commercially viable level.

In view of the background in this area, there remain needs for improved and/or alternative methods and devices for reducing NOx emissions produced by diesel engines. The present inventions are addressed to those needs.

BRIEF SUMMARY OF THE INVENTION

In one aspect, the invention provides a diesel engine that includes a combustion chamber. The combustion chamber has a volume that is defined by an inner wall of a cylinder liner, a top surface of a piston, and a bottom surface of a cylinder head. A first injector is disposed within the cylinder head and has a first injector tip that extends to a first location within the of the volume of the combustion chamber. A second injector is disposed within the cylinder head and includes a second injector tip that extends to a second location within the volume of the combustion chamber. The first injector is configured to introduce a fuel into the volume of the combustion chamber, and the second injector is configured to introduce an additional substance into the volume of the combustion chamber. The introduction of the additional substance into the volume of the combustion chamber reduces NOx formation within the volume of the combustion chamber.

In another aspect, the invention includes an engine having a plurality of combustion chambers, each of which has a volume that is that is defined by an inner wall of a cylinder liner, a top surface of a piston, and a bottom surface of a cylinder head. Each of the volumes includes a first injector tip that extends to a first location within the volume of the combustion chamber and a second injector tip that extends to a second location within the volume of the combustion chamber. The first injector tip includes a plurality of apertures for introduction of a fuel into the volume of the combustion chamber and the second injector tip includes a plurality of apertures for introduction of an additional substance into the volume of the combustion chamber. The introduction of the additional substance into the volume of the combustion chamber reduces the overall combustion flame front temperature such that NOx formation is reduced during the combustion process.

In yet another aspect, the invention provides a method for reducing NOx formation in a diesel engine. The method includes the provision of a diesel engine having at least one combustion chamber, where the at least one combustion chamber further includes a volume that is defined by an inner wall of a cylinder liner, a top surface of a piston, and a bottom surface of a cylinder head. The method also includes the provision of a first injector in communication with the volume of the at least one combustion chamber for the introduction of fuel into the volume of the at least one combustion chamber, as well as the provision of a second injector in communication with the volume of the at least one combustion chamber for the introduction of an additional substance into the volume of the at least one combustion chamber, whereas the introduction of the additional substance into the volume of the combustion chamber reduces NOx formation.

DETAILED DESCRIPTION OF THE INVENTION

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and further applications of the principles of the invention as described herein being contemplated as would normally occur to one skilled in the art to which the invention relates.

Figure 1:
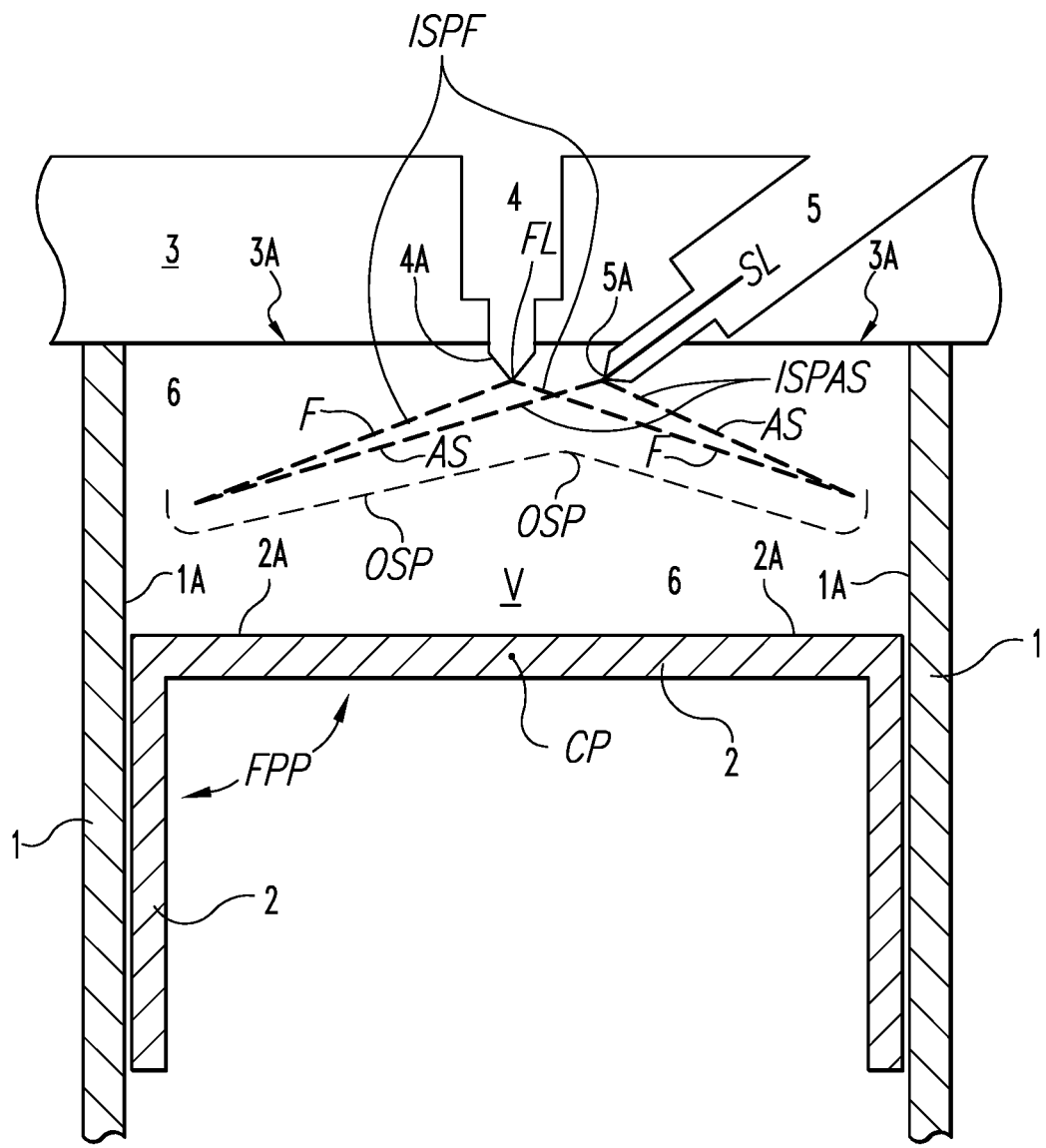
FIG. 1 depicts a cross-sectional elevation view of an illustrative embodiment of the invention.

FIG. 1 depicts a cross-sectional elevation view of an illustrative combustion chamber 6 of the invention. As shown, the combustion chamber 6 can include a volume V that is defined by the inner wall 1A of a cylinder liner 1, the top surface 2A of a piston 2, and the bottom surface 3A of a cylinder head 3 that is located above the cylinder liner 1. The volume V of the combustion chamber can be varied by movement of the piston 2 within the cylinder liner 1 between a first piston position FPP (depicted in FIG. 1) that corresponds to the position of the piston when its top surface 2A is furthest away from the bottom surface 3A of the cylinder head and a second piston position SPP (not depicted in FIG. 1) that corresponds to the position of the piston when its top surface 2A is closest to the bottom surface 3A of the cylinder head. A series of valves (not depicted) can reside within the cylinder head 3 in order to permit the flow of air (and exhaust gas recirculation) into the volume V of the combustion chamber 6, as well as the flow of exhaust gas out of the volume V of the combustion chamber 6. The valves (not depicted) can move between open and closed positions, as necessary, to facilitate the flow of air and exhaust gas in and out of the volume V of the combustion chamber 6.

A first injector 4 can be disposed within the cylinder head 3 such that its tip 4A extends to a first location FL within the volume V of the combustion chamber 6 at a location that is disposed above the center point CP of the area that defines the top surface 2A of the piston 2. The first injector 4 can be used to introduce a fuel F, such as a diesel fuel, into the volume V of the combustion chamber 6 during operation of the engine. As also shown in FIG. 1, a second injector 5 can be disposed within the cylinder head 3 such that its tip 6A extends to a second location SL within the volume V of the combustion chamber 6. Given that the tip 4A of the first injector is disposed above the center point CP, the tip 5A of the second injector 5 can be disposed at a different location within the volume V of the combustion chamber 6. As shown, for example, the second injector 5 can be offset and at an angle so as not to interfere with the first injector 4 and its tip 4A. The position and angle of both the first injector 4 and its tip 4A, as well as the second injector 5 and its tip 5A can be varied in the cylinder head 3 to accommodate various cylinder head 3 designs.

In operation, a fuel F, such as a diesel fuel, can be introduced within the volume V of the combustion chamber 6 through the first injector 4 and its tip 4A. An additional substance AS, such as water, can be injected through the second injector 5 and its tip 5A. Such additional substance AS can be introduced in such a manner so as to lower the overall combustion flame front temperature such that NOx formation is reduced during the combustion process. In certain embodiments, it is desirable to achieve an overall combustion flame front temperature of about 2100 K to about 2300K, including an overall combustion flame front temperature of about 2200 K.

In order to introduce the additional substance SA into the volume V of the combustion chamber 6 in a manner that appropriately reduces the overall combustion flame front temperature, the first injector tip 4A and the second injector tip 5A can be configured to provide desired individual spray patterns ISPF, ISPAS for the fuel F and the additional substance AS. Such individual spray patterns ISPF, ISPAS, when overlapping, can provide an overall spray pattern OSP, as is depicted in FIG. 1.

In addition to varying the individual and overall spray patterns ISPF, ISFAS, OSP, the manner and frequency of introduction of fuel F and additional substance AS can be varied to reduce the overall combustion flame front temperature. For example, the first and second injectors 4, 5 can each be configured to produce multiple introduction events per cycle, with a cycle being the movement of the piston 2 from its first piston position FPP to its second piston position SPP (not depicted) and back to its first piston position (FPP). Such multiple introduction events can be referred to as pre-introduction, main-introduction, and post-introduction. Other multiple introduction events can also include split introduction, which generally includes two, medium-sized, spaced introductions. Illustratively, each introduction event can include the introduction of fuel F and/or additional substance AS into the volume V of the combustion chamber 6. For introduction events that include the partial or fully overlapping introduction of both a fuel F and an additional substance AS into the volume V of the combustion chamber 6, such fuel F and additional substance AS may be introduced in different quantities, at different pressures, and for different durations of time. In certain embodiments, it may be desirable to introduce a first additional substance AS into the volume V of the combustion chamber 6 before combustion, a second additional substance during AS combustion, and a third additional substance AS after combustion. In other embodiments, introduction events can include any suitable variation, including as little as one introduction event from each of the first and second injectors 4, 5, as well as numerous introduction events, such as three, four, five or more introduction events from each of the first and second injectors 4, 5. Each introduction event can vary in duration, and various additional substances AS can be used for any introduction event through the second injector 5 and its tip 5A.

Additionally, the number of introduction events, the amount of fuel F and/or the amount of additional substance AS introduced during each introduction event, as well as the timing and duration of each introduction event can be configured based on the rpm and load of the engine. In some embodiments, for example, an additional substance AS, can be introduced through the tip 5A of the second injector 5 in a single introduction event that comprises a burst, while in other instances, the additional substance AS can be introduced through the tip 5A of the second injector 5 in multiple introduction events, each of which comprises a burst of varying duration. Additionally, the duration of the introduction of an additional substance AS can vary with respect to the duration of the fuel F introduction event occurring in the first injector 4. Illustratively, introduction of the additional substance AS can occur before, during and/or after introduction of the fuel F, such as in calibrated patterns. Additionally, introduction of the fuel F through the tip 4A of the first injector 4 may also occur in a single introduction event comprising a burst, or alternatively in multiple introduction events comprising bursts of varying durations, such as in conjunction with the introduction of additional substance AS through the tip 5A of the second injector 5. Moreover, the fuel F and the additional substance AS can be introduced in any suitable pattern, which can be varied, such as by varying the delivery pressure of the fuel F or additional substance AS. Suitable introduction events are typically controlled by an electronical control module (ECM).

The respective fuel F and additional substance AS pressures can be supplied by independent pumps and can be respectively controlled and varied in pressure from 0 bar to 2000 bar or more as is suitable for the application. Each injection system pressure can be independent of the other, or alternatively can be the same. The injection pressure may vary based on rpm and engine load factor (0-100%).

In certain embodiments, the additional substance AS can include a gas or liquid. In embodiments where a liquid is used, it is typically desirable to atomize such liquid through the injector so that such liquid occupies a substantially gaseous state in the combustion chamber. Suitable such liquid additional substances can include any desirable liquid substance, such as water, windshield washer fluid, methanol, ethanol, or virtually any type of fuel. Gaseous additional substances, such as steam, LPG, CNG, etc., can also be introduced into the combustion chamber, and typically do not need further atomization, although further atomization may be desirable in some embodiments.

Figure 2A:
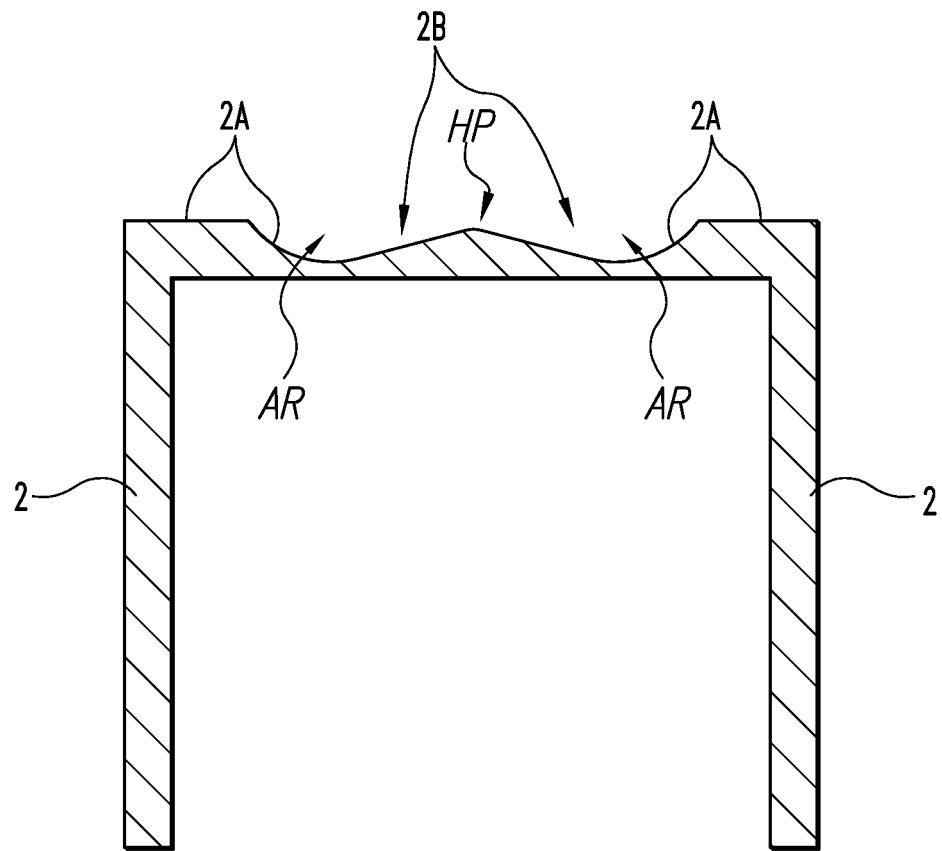
FIG. 2A depicts a cross-sectional elevation view of an illustrative piston of the invention.

As depicted in FIG. 1, the top surface 2A of the piston 2 can include a substantially flat topography. In other embodiments, however, the topography of the top surface 2A of the piston can be varied, as is true of the bottom surface 3A of the cylinder head 3. FIG. 2A, for example, which is a cross-sectional elevation view of an illustration piston 2 of the invention, depicts a piston 2 having a top surface 2A that includes a varied topography. As depicted, the top surface 2A can include a cavity 2B that occupies the general shape of a bowl. The bottom of the cavity can include a high point HP that creates an annular recess AR in the cavity 2B of the top surface 2A of the piston 2.

The topography of the cavity 2B can include any suitable configuration. Illustratively, for example, the topography of the cavity 2B can mirror the overall spray pattern OSP formed by respective individual spray patterns for fuel ISPF and additional substance ISPAS such that the cavity 2B receives the overall spray pattern OSP when the piston 2 is located at its second piston position SPP. Additionally, the high point HP of the cavity 2B can be located at any suitable location, such as near the center point CP of the area of the top surface 2A of the piston 2. In other embodiments, however, the cavity 2B can include multiple high points HP, or can even include no high points, where the cavity 2B takes on a more typical formation of a bowl. Additionally, the cavity 2B can also include any suitable depth, such as may be necessary to receive any overall spray pattern OSP or a spray pattern for a fuel F or an additional substance AS.

Figure 2B:
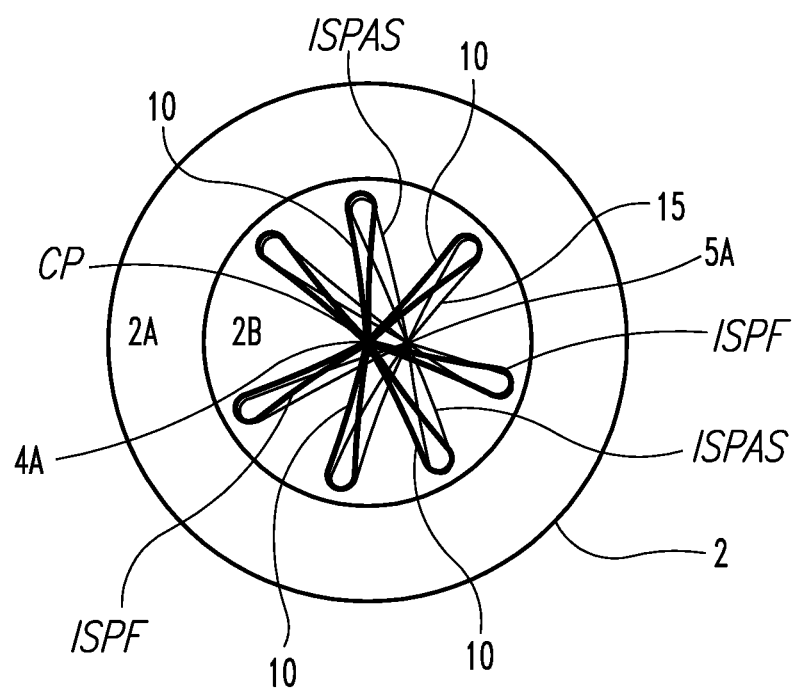
FIG. 2B depicts a top view of the illustrative piston depicted in FIG. 2A.

Turning now to FIG. 2B, a top view of the illustrative piston 2 depicted in FIG. 2A is shown. As shown, the top surface 2A of the piston 2 includes the cavity 2B depicted in FIG. 2A. Also depicted in FIG. 2B is the individual spray pattern for fuel ISPF and the individual spray pattern for additional substance ISPAS. The individual spray pattern for fuel ISPF includes 7 lobes 10 that emanate from the tip 4A of the first injector 4 which can be generally located above the center point CP of the top surface 2A of the piston 2. The individual spray pattern for additional substance ISPAS also includes 7 lobes 15 that emanate from the tip 5A of the second injector 5. The fourteen lobes 10, 15 of the respective individual spray patterns ISPF, ISPAS combines to form the overall spray pattern OSP.

The individual spray patterns ISPF, ISPAS and their locations can be varied by changing how far each injector tip 4A, 5A extends below the cylinder head 3A and into the volume V of the combustion chamber 6, as well as the topography of the top surface 2A within the cavity 2B of the piston 2. Additionally, such individual spray patterns ISPF, ISPAS can alternatively be varied by varying the type of injector, injector tip, and/or the introduction pressure.

The tip 4A of the first injector 4 depicted in FIG. 2B includes seven (7) apertures for introduction the fuel F into the volume V of the combustion chamber 6. The tip 5A of the second injector 5 depicted in FIG. 2B likewise includes seven (7) apertures for introduction of the additional substance AS into the volume V of the combustion chamber 6. Each of the seven apertures creates the respective lobes 10, 15 depicted in FIG. 2B. In alternative embodiments, however, the first and second injector tips 4A, 5A can include any suitable number of apertures to introduce the fuel F and additional substance AS into the volume V of the combustion chamber 6. Moreover, the angle of the spray coming out of each aperture can be varied to change the angle of the spray in relationship to the top surface 2A of the piston 2. Each aperture in the first and second injector tips 4A, 5A has an aperture length, as well as an aperture diameter. There is a relationship between aperture length and aperture diameter that can be referred to as the L/D ratio. The L/D ratio can determine characteristics of the respective individual spray patterns, ISPF, ISPAS, as well as the penetration of the spray and the dispersion of the spray within the volume V of the combustion chamber 6. As stated above, the characteristics of the respective individual spray patterns ISPF, ISPAS can impact the overall spray pattern OSP. In certain embodiments, for example, it is desirable to maximize the interaction of the respective individual spray patterns ISPF, ISPAS because this may slow the heat release of the burn and reduces peak temperatures along the flame fronts.

In any embodiment of this invention, the features and controls can be integrated with a computerized engine control module or as a stand-alone control module that communicates with other modules in the application. Engine ECMS have internal logic to utilize sensor data and output control signals to various engine hardware to determine system function.

In other embodiments (not depicted), a single injector can be utilized to inject two fluids independently of each other. General reference can be made, for example to U.S. Pat. No. 8,459,575 to Ricco et al., which is hereby incorporated herein by reference in its entirety, for a description of a dual injector design that has two nozzles in one injector. Alternative fuel injectors, such as a dual fuel injector with one nozzle and two check needles, can be used to implement embodiments of the invention as are depicted in U.S. Pat. No. 8,733,326 to Kim et al., which is hereby incorporated herein by reference in its entirety.

The addition of a second injector 5 (be it a second independent injection or a single, dual tipped injector) can allow for increased swirl inside the volume V of the combustion chamber 6 for better mixing depending on the angle of attack for spray interference. Proper implementation will improve engine longevity due to less contaminants formed during combustion.

The additional substance AS can provide desirable effects on the diesel burn rate and temperature to allow for reduced NOx, CO2 and PM emissions. HC and CO may increase, but these emissions can be cleaned up with an oxidation catalyst in the exhaust system.

In certain embodiments, the invention can include any or all of the following: a water supply tank, one or more pumps to supply the injectors 4, 5 with proper pressure, by-pass loops if needed, a purge system, a priming system, a lubricating system, a pressure bleed system, fluid lines, common-rail, pressure monitoring, temperature sensing, fluid chemistry sensing, electronic control unit and software for controls.

This concept can be adapted to fit any suitable engine to achieve any desired result (such as something other than NOx reduction) where the following fuels can be injected through the first injector 4: diesel, bio-diesel fuel, Jet-A, JP8, gasoline, natural gas, and the like. Several types of fuel systems are on the market from pump style mechanical injection pumps, to common rail or intensifier injection systems. These differences are inconsequential as it relates to adding a second injection system for an additional substance AS.

Any suitable number of injectors, such as one, two, three, four, or five injectors, can be used in embodiments of the invention, each of which may include single or dual injectors. By way of example, engines that include larger combustion chamber 6 volumes V may need more injectors to achieve suitable combustion in accordance with embodiments of the invention. In some embodiments, it may be desirable for the injectors and/or their tips to atomize the fuel F or additional substance AS, but in other embodiments, full or partial atomization of the fuel F or additional substance AS may not be desirable. The injectors may comprise any suitable material, such as carbon steel, stainless steel, and/or any suitable plastic material, such as a polymer.

All publications cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A diesel engine, comprising:
   a combustion chamber, said combustion chamber including a volume that is defined by an inner wall of a cylinder liner, a top surface of a piston, and a bottom surface of a cylinder head;
   a first injector disposed within said cylinder head, wherein said first injector includes a first injector tip, wherein said first injector tip extends to a first location within the volume of the combustion chamber;
   a second injector disposed within said cylinder head, wherein said second injector includes a second injector tip, wherein said second injector tip extends to a second location within the volume of the combustion chamber;
   wherein said first injector is configured to introduce a fuel into the volume of the combustion chamber;
   wherein said second injector is configured to introduce an additional substance into the volume of the combustion chamber;
   wherein the introduction of the additional substance into the volume of the combustion chamber reduces NOx formation within the volume of the combustion chamber and
   wherein said first injector tip and said second injector tip are disposed within a dual injector.

2. The diesel engine of claim 1, wherein said fuel comprises diesel fuel.

3. The diesel engine of claim 1, wherein said additional substance comprises water.

4. The diesel engine of claim 2, wherein said first injector is configured to create an individual spray pattern for said fuel within the volume of the combustion chamber.

5. The diesel engine of claim 4, wherein said second injector is configured to create an individual spray pattern for said additional substance within the volume of the combustion chamber.

6. The diesel engine of claim 5, wherein said top surface of said piston further includes a cavity.

7. The diesel engine of claim 6, wherein said cavity occupies the geometric shape produced by the individual spray pattern for fuel and the individual spray pattern for additional substance.

8. An engine comprising:
   a plurality of combustion chambers, wherein each of said plurality of combustion chambers includes a volume that is that is defined by an inner wall of a cylinder liner, a top surface of a piston, and a bottom surface of a cylinder head;
   wherein each of said volumes includes a first injector tip that extends to a first location within the volume of the combustion chamber and a second injector tip that extends to a second location within the volume of the combustion chamber;
   wherein said first injector tip includes a plurality of apertures for introduction of a fuel into the volume of the combustion chamber and wherein said second injector tip includes a plurality of apertures for introduction of an additional substance into the volume of the combustion chamber;
   wherein said first injector tip and said second injector tip are disposed within a dual injector; and
   wherein the introduction of the additional substance into the volume of the combustion chamber reduces the overall combustion flame front temperature to from about 2100 K to about 2300 K such that NOx formation is reduced during the combustion process.

9. The engine of claim 8, wherein said additional substance further comprises water.

10. A method for reducing NOx formation in a diesel engine, comprising:
- providing a diesel engine having at least one combustion chamber, said at least one combustion chamber further comprising a volume that is defined by an inner wall of a cylinder liner, a top surface of a piston, and a bottom surface of a cylinder head;
- providing a first injector in communication with the volume of the at least one combustion chamber for the introduction of fuel into the volume of the at least one combustion chamber;
- providing a second injector in communication with the volume of the at least one combustion chamber for the introduction of an additional substance into the volume of the at least one combustion chamber
  - wherein said first injector has a first injector tip and wherein said second injector has a second injector tip, wherein said first injector tip and said second injector tip are disposed within a dual injector; and
  - wherein said additional substance is selected from a group consisting of windshield washer fluid, methanol, or ethanol, whereas the introduction of the additional substance into the volume of the combustion chamber reduces NOx formation.

11. The method of claim 10, whereas the additional substance comprises water.

* * * * *